Oct. 30, 1956  R. W. MATTSON  2,768,882
CATALYTIC REACTOR
Filed May 11, 1951
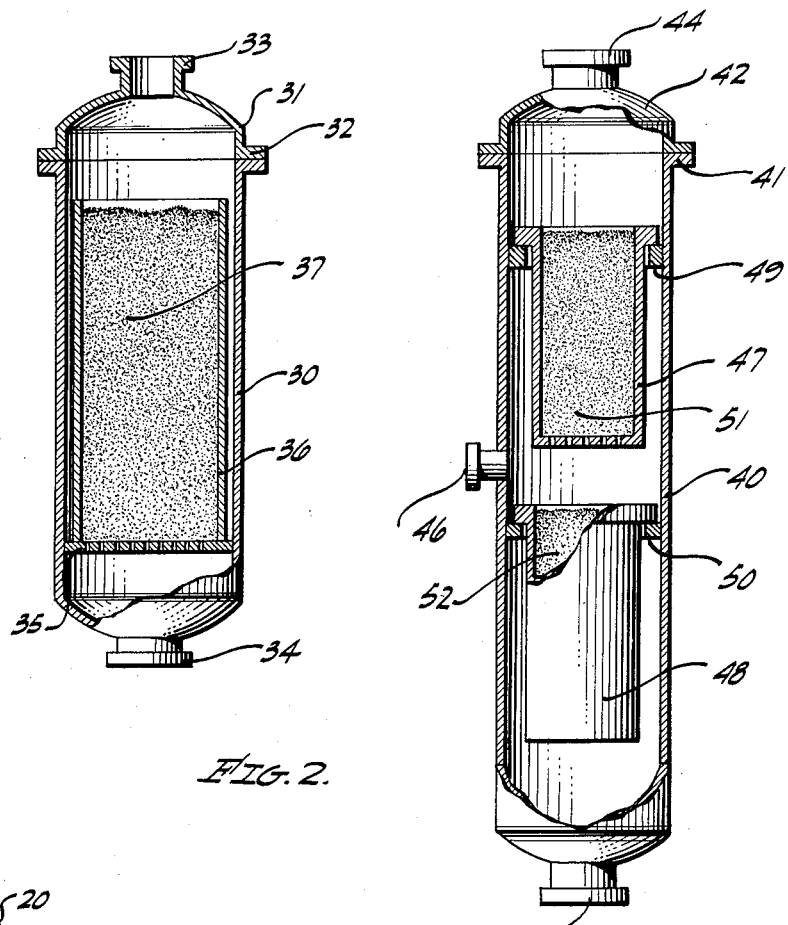
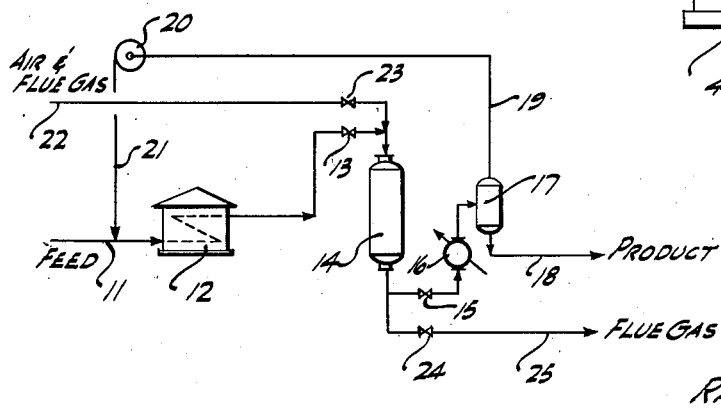
INVENTOR.
RAYMOND W. MATTSON,
BY
Raymond N. Fleck
AGENT United States Patent Office 2,768,882
Patented Oct. 30, 1956

2,768,882
CATALYTIC REACTOR

Raymond W. Mattson, Yorba Linda, Calif., assignor to Union Oil Company of California, Los Angeles, Calif., a corporation of California Application May 11, 1951, Serial No. 225,803

2 Claims. (Cl. 23—288)

This invention relates generally to a fixed bed catalytic process and to a fixed bed catalytic reactor. More particularly this invention relates to a method and apparatus for laterally supporting a fixed bed of catalyst within a reactor such that the thermal expansion and contraction of the lateral support does not oppose the corresponding expansion and contraction of the catalyst bed.

Fixed bed catalytic reactors are widely used in the chemical and petroleum processing industries. In many processes carbon which accumulates on the catalyst during reaction must be periodically removed by combustion in an oxygen containing gas stream to revivify the catalyst and restore it to a high level of activity. The reaction is conducted in the presence of a catalyst for a time, the catalyst is then freed of combustible and desorbable vapors, and the deposits are removed in a regeneration part of the cycle. After purging, the catalyst is again employed for catalyzing the desired reaction. Most generally the reaction cycle is conducted at one temperature level, e. g. $T_1$, and the regeneration is conducted at a different temperature level, e. g. $T_2$, which is usually at least 50° F. or higher than the reaction temperature level and is often several hundred degrees higher.

Another characteristic of such processes is that a gradual production and accumulation of fines occurs which decrease the efficiency of the catalyst bed and increase the pressure drop therethrough. This fining has generally been attributed to thermal stresses and strains which are set up within the catalyst pill or granule due to its relatively low thermal conductivity and the rapid temperature changes which occur on the exterior of the catalyst during the cycle operation.

It has now been found that a substantial portion, if not the entire portion, of the catalyst fining results from the difference in the coefficients of thermal expansion between the catalyst bed on the one hand and the lateral supporting member or members on the other hand. In the usual case the catalyst bed is laterally supported directly or indirectly by the metal wall of the reactor vessel which is almost invariably constructed of iron, steel or some similar construction metal. The greater thermal expansion of the metal wall relative to the expansion of the catalyst bed partially removes the lateral support and permits the catalyst to settle when both are hot. When the metal wall contracts during the cooler portion of the cycle, it necessarily crushes a portion of the setttled catalyst which is unable to contract to the same extent. In certain cases the catalyst may be separated from the steel wall by firebrick, but even in this case the relatively greater expansion and contraction of the steel wall compresses and releases the lateral support of the brick wall causing the catalyst bed to expand in width and settle during the relatively hot portion of the cycle and to be compressed and crushed during the relatively cold part of the cycle. Where the catalyst bed directly contacts the metal retaining wall such forces are directly transmitted to the catalyst bed itself.

It is therefore an object of this invention to provide a catalytic reactor and a method for supporting catalysts wherein the lateral support of the catalyst bed is substantially unchanged during relative heating and cooling and catalyst fining is minimized thereby.

It is another object of this invention to provide a catalytic reactor for regenerative type catalytic processes.

It is another object of this invention to provide a catalytic reactor for use in cyclical catalytic processes wherein the catalyst is cyclically heated and cooled over a temperature range of at least above 50° F.

Other objects and advantages of this invention will become apparent to those skilled in the art as the description thereof proceeds.

Briefly this invention relates to a method and apparatus for the lateral support of a catalyst bed undergoing cyclical temperature variation wherein the lateral support is substantially constant during periods of temperature changes. In the application of the invention the catalyst bed is laterally enclosed in a solid retaining wall fashioned of a material having a coefficient of thermal expansion which is within at least 50% of the coefficient of thermal expansion of the catalyst bed and is preferably within about 25% of such coefficient. A pressure vessel is employed around the retaining wall which prevents a vapor loss from the system.

Figure 1 shows a flow diagram of a typical cyclical hydrocarbon conversion process employing a fixed bed.

Figure 2 shows a catalytic reactor employing a single unitary lateral support for the catalyst bed.

Figure 3 shows a modification of a catalytic reactor wherein the catalyst is distributed in two catalyst beds, each of the catalyst beds being supported entirely within a perforated crucible having a coefficient of thermal expansion similar to that of the catalyst bed.

Most catalysts which are employed industrially have relatively low coefficients of thermal expansion and generally the linear thermal coefficient of expansion of most catalysts lies in the interval $2.8 \times 10^{-6}$ to $5.3 \times 10^{-6}$ per degree Fahrenheit. Catalysts and catalytic carriers which fall into this group include silica, alumina, silica-alumina, zirconia and magnesia, as well as the foregoing materials containing minor proportions of various catalytic agents such as metal oxides and sulfides.

Materials of construction which possess similar linear coefficients of expansion include refractory alumina, Alundum, corundum, sillimanite, porcelain, mullite, zirconia, zircon, and the like.

Referring now more particularly to Figure 1, a hydrocarbon feed stock is introduced through line 11 whence it flows through heater 12 and valve 13 through reactor 14. Effluent vapors from reactor 14 pass through valve 15 and condenser 16 to gas separating drum 17. Liquid product from separating vessel 17 is discharged through line 18. Product gases containing hydrogen are removed from the tube of separating vessel 17 through line 19 whence they flow through compressor or blower 20 and line 21 for recycle through furnace 12. In certain processes recycle hydrogen is neither employed nor required however.

After an appreciable amount of carbonaceous material has been deposited on the catalyst within reactor 14 the regeneration cycle is commenced by closing valves 13 and 15 and introducing flue gas containing varying amounts of air or oxygen through line 22 whence they pass through opened valve 23 to reactor 14. Regeneration gases are withdrawn from reactor 14 through valve 24 and are discharged through line 25.

In operating a process of this type which is, for example, hydroforming, the reaction temperature during hydrocarbon conversion will be, for example, 800° to 1000° F. while the catalyst during regeneration will normally be heated to 1100° F. or more.

Referring now more particularly to Figure 2, the reactor consists of a pressure retaining lower member 30 and an upper pressure retaining member 31 which is fitted to member 30 by flange 32. Member 31 is fitted with vapor inlet 33 while member 30 is fitted with vapor discharge 34. In certain instances the vapor flow through the reactor may be reversed so as to be upflow.

Member 30 is fitted with a perforated plate 35 which may be steel, ceramic or any other material of construction. A tubular member 36 rests on perforated plate 35 so as to circumscribe the area of perforations. Tubular member 36 is fashioned of a material having a coefficient of thermal expansion which is substantially similar to the coefficient of expansion of the catalyst to be employed. Tubular member 36 together with perforated plate 35 enclose catalyst bed 37. Vapor flow passing through catalyst bed 37 enters, or exits, through the perforations of perforated plate 35.

During thermal changes of catalyst bed 37 tubular member 36 expands and contracts substantially the same amount so as to prevent a cyclic packing and crushing of the catalyst therein.

Referring now more particularly to Figure 3, lower pressure retaining member 40 is fitted through flange 41 to upper pressure retaining member 42. Member 42 is fitted with vapor inlet or outlet 44 while lower pressure retaining member 40 is fitted with inlets 45 and 46 which may be employed as outlets if desired. The interior of the reactor consists of two crucibles 47 and 48 respectively, which have perforated bottoms to permit vapor flow therethrough. Crucibles 47 and 48 are supported by supporting rings 49 and 50 respectively, which are welded or bolted to member 40 to provide for easy adit and exit of the crucibles.

In a manner similar to that described in connection with Figure 2 the walls of crucibles 47 and 48 provide a substantially constant lateral support for their respective catalyst beds 51 and 52 respectively, since the expansion of the crucible corresponds in magnitude to the expansion of the catalyst.

The ceramic supporting walls employed for catalyst support need only have sufficient strength to support the catalyst bed itself since the bulk of the internal pressure and weight of the structure is maintained and supported by the outer steel vessel surrounding the catalyst bed. The ceramic vessel or vessels are arranged in such a manner that the fluids, either gases or liquids, which are to be contacted with the catalyst, flow through the catalyst bed and do not by-pass through the annular space beween the ceramic vessel and the metal reactor wall.

Perhaps the method and apparatus of this invention can better be understood by reference to the following example:

*Example*

The catalyst employed in the following experiments was a cobalt molybdate catalyst supported on a silica-alumina carrier which had an overall composition which was approximately as follows:

| Component: | Percentage, by weight |
|---|---|
| CoO | 3 |
| $MoO_3$ | 8 |
| $SiO_2$ | 5 |
| $Al_2O_3$ | 84 |
| Total | 100 |

The catalyst was employed as ¼ inch pills about ¼ inch in length.

In the first experiment the reactor consisted of a 20 inch vertical section of 3 inch stainless steel pipe which was closed at the lower end. The apparatus was adapted for alternately heating with gas burners and cooling by blowing cold air against the exterior wall of the reactor. The reactor was charged to a height of 12 inches with the aforedescribed catalyst and 3 inches of ¼ inch steel pellets were placed over the catalyst and weighted so as to produce a pressure on the lower portion of the catalyst equivalent to a 6 foot catalyst bed. The exterior of the steel pipe was alternately heated and cooled between the limits 700° F. and 1100° F. After 30 cycles, each cycle requiring approximately one hour for completion, the catalyst was removed and screened to determine catalyst attrition. The following mesh analysis of the discharged catalyst was obtained.

| Mesh size: | Percentage, by weight |
|---|---|
| Under 20 | 1.3 |
| 8/20 | 1.5 |
| 4/8 | 6.4 |
| Over 4 | 90.8 |
| Total | 100.0 |

The foregoing data show that an appreciable attrition of the catalyst results from alternate heating and cooling when the catalyst is laterally supported by a material having a much greater coefficient of thermal expansion than the catalyst. Approximately 34 percent of the original pellets were damaged by cracking, crushing, and the like.

In a second experiment the method of testing was substantially the same as that described for the first experiment with the exception that no weights were placed upon the top of the catalyst so that a one foot section of a catalyst bed was tested. The following results were obtained after 30 cycles of heating and cooling:

| Mesh size: | Percentage, by weight |
|---|---|
| Under 20 | 0.4 |
| 8/20 | 0.6 |
| 4/8 | 2.3 |
| Over 4 | 96.7 |
| Total | 100.0 |

In yet another experiment a charge of catalyst was supported in an Alundum reactor and weighed with steel pellets and weights to simulate a 6 foot section of a catalyst bed. After about 30 cycles the catalyst was removed and examined. Only about 0.2 percent of the pellets were either broken or crushed and there was substantially no fines whatsoever.

The foregoing data show that in the hot expanded metallic reactor the catalyst pellets settle and compact themselves and when the metal reactor contracts on cooling the catalyst pellets are unable to flow upwardly under the lateral compressive forces and are thereby crushed and broken with attendant fines production.

It is apparent that in broad aspect this invention relates to a fixed catalyst bed reactor design which consists of an inter-vessel or lateral supporting member which has a thermal coefficient of expansion approximating that of the catalyst. The vessel or support is placed within a conventional metallic reactor which gives the main pressure and structural support and wherein the vessel is so placed in the reactor that vapor flow is forced through the catalyst bed contained therein.

Where the catalyst bed is very narrow relative to the average dimension of the catalyst particle, little bridging of the catalyst occurs during contraction of the supporting shell. Thus this invention is most applicable where the catalyst bed is 10 and preferably 20 or more times the average diameter of the catalyst particle. Furthermore the invention is most applicable where the diameter or width of the bed is less than about 5 times the bed depth.

Catalysts which may be advantageously handled include pills, granules, balls and the like. Generally speaking catalysts larger than about 1/16 inch in diameter are most subject to bridging and fining when supported by metallic supports.

The foregoing disclosure of this invention is not to be considered as limiting since many variations may be made by those skilled in the art without departing from the spirit or scope of the following claims.

I claim:

1. An apparatus for conducting catalytic reactions comprising an elongated pressure-retaining metallic outer vessel having an inlet and an outlet at opposite extremities thereof, a catalyst-enclosing inner vessel spaced entirely a substantial distance inwardly from the upright walls of said outer vessel and having an inlet and an outlet at opposite extremities thereof, said inner vessel being positioned between the inlet and outlet of said outer vessel, said inner vessel being composed entirely of a refractory material having a coefficient of linear thermal expansion within about 25% of the coefficient of linear thermal expansion of the granular catalyst hereinafter defined, a flat metallic up-facing supporting shoulder attached to and conjoining an entire horizontal inner circumference of said outer vessel, said shoulder overlapping and registering gravity-wise over its entire up-facing inner circumferential area with the outer peripheral under-surface of a down-facing circumferential element integral to said inner vessel, said registering of said shoulder and said down-facing circumferential element: (1) forming a substantially fluid-tight, thermally unresponsive seal between said two vessels, and (2) laterally non-rigidly supporting said inner vessel, said inner vessel being at least partially filled with a catalyst bed composed of disjoined frangible granules having a coefficient of linear thermal expansion between about $2.8 \times 10^{-6}$ and $5.3 \times 10^{-6}$ per degree F., the mean diameter of said catalyst bed being: (1) less than about 5 times its depth, and (2) at least about 10 times the average diameter of said catalyst granules.

2. An apparatus as defined in claim 1 wherein said inner vessel is composed of a material selected from the group consisting of refractory alumina, Alundum, corundum, sillimanite, porcelain, mullite, zirconia, and zircon, and wherein said catalyst granules are composed predominantly of a material selected from the group consisting of silica, alumina, silica-alumina, zirconia and magnesia.

References Cited in the file of this patent

UNITED STATES PATENTS

| | | |
|---|---|---|
| 1,396,718 | Backhaus | Nov. 8, 1921 |
| 2,230,467 | Nelly et al. | Feb. 4, 1941 |
| 2,244,210 | Nashan | June 3, 1941 |
| 2,289,063 | Ocon et al. | July 7, 1942 |
| 2,398,546 | Messmore | Apr. 16, 1946 |
| 2,436,282 | Bennett | Feb. 17, 1948 |
| 2,459,907 | Winslow et al. | Jan. 25, 1949 |
| 2,545,384 | Rehrig | Mar. 13, 1951 |
| 2,584,080 | Houpt | Jan. 29, 1952 |
| 2,646,391 | Houdry | July 21, 1953 |